United States Patent
Cornelius et al.

(10) Patent No.: US 6,773,104 B2
(45) Date of Patent: Aug. 10, 2004

(54) ULTRAVIOLET FILTER COATING

(75) Inventors: Lester E. Cornelius, Oyster Bay, NY (US); Toshinori Torii, Yokohama (JP)

(73) Assignees: Optical Technologies Corp., Long Island City, NY (US); Mitsubishi Chemical Corp., Tokyo (JP)

( * ) Notice: Subject to any disclaimer, the term of this patent is extended or adjusted under 35 U.S.C. 154(b) by 0 days.

(21) Appl. No.: 09/910,691

(22) Filed: Jul. 20, 2001

(65) Prior Publication Data

US 2003/0170467 A1 Sep. 11, 2003

Related U.S. Application Data

(63) Continuation-in-part of application No. 09/849,884, filed on May 4, 2001, now abandoned.
(60) Provisional application No. 60/220,173, filed on Jul. 24, 2000.

(51) Int. Cl.[7] .............. B41J 3/407; G02B 5/20; B32B 33/00; B32B 7/06; B32B 7/12
(52) U.S. Cl. ............ 347/106; 347/101; 347/103; 347/105; 347/213; 428/41.8; 428/409; 428/411.1; 359/359; 359/361
(58) Field of Search ................ 428/41.8, 409, 428/411.1; 359/359, 360, 361; 252/588, 589; 347/101, 103, 105, 106, 213

(56) References Cited

U.S. PATENT DOCUMENTS

| | | | |
|---|---|---|---|
| 5,387,458 A | 2/1995 | Pavelka et al. | |
| 5,427,997 A | 6/1995 | Oshima et al. | |
| 5,480,722 A | 1/1996 | Tomonaga et al. | |
| 5,527,759 A | 6/1996 | Oshima et al. | |
| 5,646,089 A | 7/1997 | Oshima et al. | |
| 5,728,645 A | 3/1998 | Oshima et al. | |
| 5,806,834 A * | 9/1998 | Yoshida | 252/589 |
| 6,166,852 A | 12/2000 | Miro | |
| 6,468,609 B2 * | 10/2002 | Marien et al. | 428/1.1 |
| 2003/0080326 A1 * | 5/2003 | Schunk et al. | 252/589 |

FOREIGN PATENT DOCUMENTS

| | | |
|---|---|---|
| JP | 61-230973 | 10/1986 |
| JP | 61-230974 | 10/1986 |
| JP | 62-059076 | 3/1987 |
| JP | 5-328413 | 7/1995 |
| JP | 6-267090 | 5/1996 |
| WO | WO 02/08664 A1 | 1/2002 |

* cited by examiner

Primary Examiner—Philip Tucker
Assistant Examiner—Micheal J Feely
(74) Attorney, Agent, or Firm—Amster, Rothstein & Ebenstein LLP (57) ABSTRACT

The application discloses a two-layered coating system using an ultraviolet absorber in its inner layer (called the blocking layer), furthest away from the source of ultraviolet exposure, with a fluorescent material that reflects ultraviolet radiation back as blue light. The ultraviolet absorber in the inner layer is used in sufficient concentration to have an ultraviolet cutoff, which can be extended with the fluorescent material. The ultraviolet block material of the present invention has transmittance of the light within a range of wavelength of 300–380 nm of 10% or less, preferably transmittance of the light within a range of wavelength of 300–390 nm of 10% or less, and, particularly preferably, transmittance of the light within a range of 300–400 nm of 10% or less, while it has a transmittance of the light within a range of 420–800 nm wavelength of 90% or more, or, preferably, 95% or more.

64 Claims, 2 Drawing Sheets

ULTRAVIOLET FILTER COATING

RELATED APPLICATIONS

The subject application is a continuation-in-part of U.S. Ser. No. 09/849,884, filed May 4, 2001, now abandoned, and claims the benefit of U.S. Provisional Application No. 60/220,173, filed Jul. 24, 2000, the contents of both of which are hereby incorporated by reference into the subject application.
General Embodiment 1

BACKGROUND OF THE INVENTION

Ultraviolet radiation is composed of three ranges, namely: UVA, which is from 320 to 400 nanometers, UVB which is from which is from 280 to 320 nanometers, and UVC which is from 100 to 280 nanometers. UVA and UVB are attenuated by the atmosphere, but is still reaches the earth's surface. UVC is usually blocked by the ozone in the atmosphere. Man-made lighting sources also produce ultraviolet radiation. Most fluorescent lighting has a high output in the UVA range. UVB causes more damage than UVA, but all ultraviolet radiation will cause degradation to materials.

Ultraviolet rays from the sun, or from man-made sources, degrade many materials by breaking their molecular bonds. Dyes and inks fade from ultraviolet, plastics lose their properties, paints chalk and fade, and many other items are damaged. Strategies to combat ultraviolet degradation include the use of materials that absorb ultraviolet radiation and convert it to heat energy. Most absorbers have an ultraviolet cutoff of 365 nanometers. A few have higher cutoffs, up to 384 nanometers with little to no yellowing. The phenomenon of producing a yellow cast when absorbers are used to block all of the ultraviolet radiation is due to the gradual slope of the absorption curve of the absorbing material. This slope, when the cutoff is extended to 400 nanometers, causes absorption of violet and blue light. The absence of blue light is perceived as yellow, and it is for this reason that most absorbers, especially in clear overcoatings, are not used to block all of the ultraviolet radiation up to 400 nm.

The optical density of a filter, an absorber, or a coating, to a range of radiation, is directly related to the concentration and thickness of the layer. The thinner the layer, the light the concentration of absorber is required. Very thin coating layers, below 10 microns cannot contain sufficient levels of absorption without a significant loss in the properties of the coating material. As an example, a 4 micron clear coating might require thirty percent, by weight, of an absorber to have complete absorption up to the cutoff wavelength of the absorber. Some common classes of ultraviolet absorbers are benzophenones and benzotriazoles.

A coating layer that is effective in blocking ultraviolet and is thin has the additional advantage of lower material cost and a higher degree of possible flexibility. A coating with a log concentration of absorber, so that the physical properties of the coating layer are not diminished, as well as the lower cost of using less absorber, that blocks all ultraviolet up to 400 nm, and does not have a significant effect on blue light absorption would a significant improvement in the effort to stop ultraviolet damage to materials.

SUMMARY OF THE INVENTION

The disclosed coating system blocks ultraviolet radiation up to and including 400 nanometers, the upper end of the ultra violet light. Preventing ultraviolet (uv) radiation from reaching materials and surfaces greatly improves weatherability and resistance to physical degradation from the effects of UV radiation on chemical bonds. There currently exist many types of ultra violet inhibitors, which are meant to be included in materials to improve their resistance to uv radiation. The damage from uv radiation is greater as the wave lengths of uv become shorter. However, considerable damage still occurs from the longer wavelengths of uv radiation. It is desirable to block the uv radiation and not have yellowing effect. The disclosed coating system remains water white.

DETAILED DESCRIPTION OF THE DISCLOSED EMBODIMENTS

In accordance with the invention, the disclosed coating system is a two-layered system using a typical ultraviolet absorber in its inner layer (called the blocking layer), furthest away from the source of ultraviolet exposure, with a fluorescent material with reflects ultraviolet radiation back as blue light. The ultraviolet absorber in the inner layer is used in sufficient concentration to have an ultraviolet cutoff, which can be extended with the fluorescent material. There are natural fluorescent materials such as calcite, will mite, sprite, fluorite, and diamonds. Three are also man-made fluorescent materials used to make materials look whiter by reflecting the long wave ultraviolet radiation as blue light. These are called optical brighteners. Typical optical brighteners are disulphonates, tetrasulphonates, and hexasulphonates. These are water soluble optical brighteners. An example of a solvent soluble optical brightener is Uvitex OB from Ciba-Geigy Corp. Such optical brighteners are typically used in textiles at very low concentrations of less than one percent by weight. Their purpose is to reduce the yellowness of a material, dye, plastic, etc. The present invention provides the desired protection by combining an optical brightener with an ultraviolet radiation absorber which raises the cutoff wavelength and increases blue light, rather than absorbing blue light as a longer wavelength cutoff ultraviolet absorber would normally do.

This barrier require high levels of optical brightener to convert the longer wavelength ultraviolet radiation into blue light and do this effectively enough to block the transmission from outer layer to the inner layer due to the total conversion of longer wavelength ultraviolet to blue light. The high level of optical brightener causes a significant fluorescent effect upon exposure to ultraviolet radiation, where this layer will glow with blue light.

The Surface of the inner or blocking layer also has a significant quantity of fluorescent material, which is not protected in depth by the included ultraviolet absorber. This is the primary reason the second or outer coating layer is effective in reducing fluorescence and why it is necessary. The fluorescent material in the inner layer that lies in the matrix of resin and ultraviolet absorber is then protected from excessive fluorescent excitation. Another technique is to use an alkaline material in the outer coating to decompose the surface of the optical brightener of the blocking layer. Still another technique to reduce surface fluorescence is to use an optical brightener quencher such as OBA Quencher from Kalamazoo Paper Chemicals Corp.

While a single blocking layer can be used for protection against ultraviolet, the fluorescent blue glow is generally undesirable. In order to significantly reduce this fluorescence, it is necessary to reduce the amount of ultraviolet that reduces this layer in the peak wavelengths for fluorescence. This is done by applying an overcoating to the blocking layer, which contains some level of ultraviolet absorber that reduces the ultraviolet transmission of the wavelengths that cause fluorescence. It is then this combined effect and balance, which completely blocks ultraviolet radiation without yellowing.

The outer coating can provide other properties such as chemical resistance, scratch resistance, slip, or friction. The outer coating material can be any resin system with an ultraviolet inhibitor, but it is preferable clear and relatively ultraviolet transparent. Materials that do not absorb ultraviolet on their own are relatively unaffected by exposure to it. For this reason, typical clear outer coating resins would be aliphatic urethanes, polysiloxanes or acrylics.

Fluorescent materials have been used in may applications to "whiten" whites, or brighten colors in may products. The teclunique is to use the fluorescent material to increase the reflected blue light. The increase in blue light is perceived as a reduction in yellow light form the fluorescent material. It typically takes very small quantities of fluorescent material to accomplish this brightening effect.

UV absorbers are widely available and are commonly used with intention of blocking primarily UVB. When these uv absorbers are used to block all uv light, they increase yellow light perception due to the reduction in blue light.

Higher concentrations of fluorescent materials in a single layer coating will cause a blue fluorescent glow to the material when it is exposed to uv light. This is cosmetically objectionable. For this reason, only low concentrations are used for brightening.

Blocking uv from reaching the surface of an object is a function of film thickness and concentration. Thin films down to 3–5 microns would require very high concentrations of uv absorbers to have complete blocking power. These thin films, such as those in polysiloxane abrasion resistant coatings, would need uv absorber concentrations as high as 30 percent to accomplish an optimal absorption based on the uv absorber. At that concentration, the properties of the coating are drastically degraded.

The inside layer of the present system can be in a range of 6 microns or higher, using Uvitex OB (Ciba-Geigy), with 9–15 microns being optimum. This range is based on the maximum solubility of the uv absorber and the fluorescent material. If other uv absorbers and fluorescent materials are chosen, this film thickness range can be adjusted accordingly.

The second or outer coat, in order to maintain flexibility, must be in the 3 micron-3 mil range film thickness depending on the brittleness of the resin system. In order to maintain the properties of the outer coat at this film thickness, it is necessary to keep the uv absorber in this layer at the maximum level before degradation of the physical properties of the coating occurs.

In accordance with the invention, the disclosed system includes an outer coating which also has a uv absorber to prevent the blue glow at the inner surface of an inner layer. This blue glow will appear hazy prior to application of the outer coating.

UVA absorbers that block all uv up to 400 nm tend to be significantly yellow in color. This is because of their absorption curve. The more gradual the slope of the curve the more visible blue and violet light is absorbed which is then perceived as yellow. It is desirable when blocking uv up to 400 nm to have a very steep transmission curve with a transmission cutoff at 400 nm to avoid the yellowing effect.

Degradation due to outdoor exposure also occurs from pollutants, which are carried to the item via precipitation and air. These pollutants are typically oxides and various dilute acids such as acid rain. The pollutants can cause colorants to fade, as the molecular bonds are broken. It is desirable to have protection against this type of chemical breakdown such as a chemically resistant barrier.

Certain items, such as printed paper, can also be damaged by precipitation such as rain and snow, which, in the form of water, causes the paper to deteriorate and some print materials such as ink to bleed. It is therefore desirable to create a barrier to precipitation for good outdoor weatherability.

There currently exist coatings and laminations, which are partial uv blockers and which are transparent but have poor abrasion resistance, such as vinyl coatings and laminates. It is desirable to have good abrasion resistance in a product to be used outdoors to prevent changes in gloss levels from abrasion which might be caused by windborne debris or cleaning.

The current practice of including uv absorbers in the body of plastic items or in overcoatings is often of limited effectiveness because it is weakened by the relationship of film thickness and concentration of uv absorber. The thicker the coating the lower the concentration of uv blocker necessary. Thin coatings are often desirable due to cost and flexibility. When a uv absorber is included in a colored molded item, the surface has the lowest concentration of uv absorber and so this surface degrades quicker than the material behind this surface. Thus, even though the colored material contains uv absorber, its relative concentration at the surface of the item is low, so the color fades at the surface. With suitable coating, the weatherability of a molded plastic item is improved in terms of physical properties except for a significant improvement in color fade, as this is a surface effect. The bulk of the material has protection in depth.

The best combination of protection against color fade is to include pigments, which are resistant to uv degradation along with uv inhibitors. In the inkjet industry it is common to combine uv resistant inks with an uv inhibiting outer laminate for further Protection against fading in applications where long term exposure to uv is expected.

Solvent selection requires compatibility with the resin systems and additives, leveling characteristics, and the prevention of crystallization of the additives. The following examples are illustrative.

EXAMPLE 1-1

The following example achieves a 9–10 micron film thickness. Percentages are by weight of volume solids.

| Inner Coating | |
|---|---|
| Acryloid A 21 - (Rohm & Haas) | 25% |
| Uvitex OB - (Ciba-Geigy Corp.) | 11% based on solids |
| Tinuvin 328 - (Ciba-Geigy Corp.) | 8% based on solids |
| Acetylacetone | 8% based on total weight |
| Diluent toluene or xylene - depending upon method of application. | |

| Outer Coating | |
|---|---|
| A second coating is used to achieve a 3–4 micron film thickness. It comprises: | |
| GR 653 polysiloxane coating - (Techneglas) | 25% solids<br>97.5 parts |
| Tinuvin 328 - (Ciba-Geigy Corp.) | 1.5 parts |
| Toluene - | 1 part |

EXAMPLE 1-2

| Inside Layer - Urethane | |
|---|---|
| Desmodur N-75: Bayer | 36% of urethane solids |
| Desmophen 670A-80: Bayer | 64% of urethane solids |
| Catalyst, dibutyltindilaurate: | 0.1% based on urethane solids |
| UV inhibitor, Tinuvin 328 - (Ciba-Geigy) | 8% based on urethane solids |
| Fluorescent, Tinuvin OB - (Ciba-Geigy) | 11% based on urethane solids |
| Surfactant, Flurad 430 - (3M) | 0.1% based on urethane solids |
| Diluent, Toluene | To make 100% |

The best order for mixing is to determine the amount of toluene that will be the diluent and stir in the Tinuvin OB until it completely dissolves. Add the uv inhibitor and stir until completely dissolved. Add the Desmophen 670–80A and stir until completely dissolved. Add the dibutyltindilaurate and stir. Add the catalyst and stir gently, until it is completely dissolved. The solids level of this coating can be adjusted to the processing technique and conditions to achieve approximately 15 microns film thickness. The lower the film thickness, the higher the required level of Tinuvin 328 and Tinuvin OB. The ratio between uv inhibitor and fluorescent material is dependent on the uv absorption of the inhibitor and the wavelength shift of the fluorescent material. The goal is to make the uv cut-off up to 400 nm and then have maximum light transmission for the visible spectrum.

| Outer Layer - Acrylic | |
|---|---|
| Acryloid A-21 - (Rohm & Haas) | received at 30% solids, diluted to 25% solids with toluene |
| Flurad 430 (3M) | 0.1% based on total coating solids |
| Tinuvin 328 - (Ciba-Geigy) | 8% based on A-21 solids |
| Tinuvin OB - (Ciba-Geigy) | 11% based on A-21 solids |
| Acetylacetone | 8% of total weight |

EXAMPLE 1-3

| Polysiloxane Outer Layer | |
|---|---|
| SHC 4000 (General Electric) | 98.4% |
| Tinuvin-328 (Ciba-Geigy) | 1.5% |
| Triethanolamine (optical brightener) | 0.01% |
| Toluene or xylene solvent to achieve desired film thickness. | |

| Acrylic Inner Layer | |
|---|---|
| Joncryl 537 - (Johnson's Wax) | Aqueous acrylic dispersion |
| Uvinul D40 - (BASF-Wyandotte) | 8% based on resin solids |
| Flurad 430 - (3M) | 0.1% based on resin solids |
| Triethanolamine | 0.1% based on resin solids |
| OBA Quencher - (Kalamazoo Chemical Corp.) | 0.1% based on resin solids |

The outer coatings provide desired physical properties and they provide quenching of the optical brightener at the surface of the inside coating. This quenching is accomplished by uv transmission reduction by the outer coating an/or by adding a higher pH material, such as minor amounts of tetramethylaminohydroxine to the outer coating which quenches the optical brightener.

Some typical applications are store front display windows to protect the items on display from ultraviolet damage, protection of inkjet prints which are very susceptible to ultraviolet degradation plastic sheeting which degrades and turns yellow in outdoor applications, works of art which are subject to man-made ultraviolet radiation, and, in general, any item that is damaged by ultraviolet radiation. In order to achieve weatherability of inkjet prints which may be used for signs, posters, billboards, etc., it is often necessary to laminate them with films that provide protection against ultraviolet radiation.

In another embodiment, a thin layer of polyester film is coated on one surface with the blocking layer and the second coating is applied to the opposite surface. The film is provided with a suitable laminating adhesive, such as heat-activated vinyl, EVA, and similar adhesives. The film may be applied to an inkjet print on the printed side. This embodiment of the coating systems forms a thin flexible transparent tear resistant laminate which blocks out ultraviolet to less than one percent transmission at 400 nm and to less than 0.1% transmission below 400 nm down to 280 nm. A polysiloxane coating also provides scratch resistance, as well as chemical resistance.

By providing a two-layer system, rather than a single layer system, It is possible to have the inner layer absorb the bulk of received ultraviolet radiation, and reflect radiation above 375 nm as blue light, so that the coating is seen as clear rather than as a yellow tint. Most conveniently, both layers are applied using known spraying techniques in serial fashion, which lends itself to the application of both layers upon a thin polyester film, and the like. Other methods are possible, including dipping, flow-coating, curtain coating or by any other liquid application method. I wish it to be understood that I do not consider the invention to be limited to the precise detains and examples described hereinabove, for obvious modifications will occur to those skilled in the art to which the invention pertains.

General Embodiment 2

BACKGROUND OF THE INVENTION

This invention relates generally to the field of light blocking or light absorbing filters, and more particularly to an improved filter material suitable for blocking harmful ultraviolet rays from artificial light transmitting sources.

It is known in the art to provide ultraviolet light blocking filters which are in the form of coatable fluids, or laminated sheets of clear synthetic resinous materials which are applied directly to an article to be protected to improve the resistance fading and other deterioration caused by exposure to daylight, and in particular, sunlight. Radiation in the ultraviolet spectrum and particularly that in the range of 365 nm and 400 nm is particularly destructive. However, most widely used filtering materials are effective up to about 365 nm, but are of drastically reduced effectiveness above that value.

Many valuable, indeed, irreplaceable objects are exhibited in museums, which for the most part are illuminated by artificial light of both fluorescent and incandescent types. For the most part, such lighting does not provide a serious problem. Such museums are, however, visited by millions of viewers each year, many of whom take their own photographs using electronic flash units which transmit light of a quality having sufficient ultraviolet wave lengths including the above mentioned upper range. While a single exposure produces negligible amounts of ultraviolet light, where even a small fraction of the visitors photograph the same objects, the cumulative effect of such exposure is substantial. As a result, many museums, forbid the taking of photographs by visitors altogether.

Because electronic flash illumination is normally transmitted through a focusing lens, it has not been heretofore possible to filter this light as a practical matter.

SUMMARY OF THE INVENTION

Briefly stated, the invention contemplates the provision of a novel ultraviolet filter material capable of full ultraviolet wave blockage in coatable fluid form which may be readily permanently adhered to transparent glass or plastic surfaces, and which will not interfere with the transmission of visible and photoactinic energy. This material is applied preferably to the inner surfaces of electronic photo flash lamps or focusing lens therefor, and may also be used in the manufacture of any light source in which the elimination of ultraviolet light is desirable. Most suitably, the composition is applied in thickness ranging from five to ten microns using standard application techniques, such as flow coating, spray coating, dipping, curtain coating and the like. It may also be used with coating thicknesses of as little as 2 microns, with the use of certain precautions.

It is a principal object of the present invention to provide a coating which can be applied to the lens or envelope of a light source, or a window which is transmitting light, that will be waterwhite, and efficiently block ultraviolet emission employing coating thickness of less than 50 microns, typically less than 10 microns. It is also an object of this invention to block ultraviolet transmission from light sources which typically also emit heat. This aspect is important with regard to any resin system thermally degrading and yellowing or cracking.

Sources or lenses covering light sources can be coated with resin systems that are themselves, for the most part, transparent to ultraviolet transmission, and so unaffected by it, and that contain ultraviolet inhibitors or other ultraviolet reducing materials such as fluorescent materials which will efficiently block ultraviolet transmission. These coatings can be applied to laminating films which can be applied to flat surfaces, or to laminating films which can be thermal formed over curved surfaces.

Certain of the disclosed embodiments are not only capable of blocking ultraviolet light, but actually converting at least a portion of the ultraviolet light to visible light, thus increasing the efficiency of light transmission which is particularly useful when the covering is applied to an incandescent or fluorescent light source. This effect is obtained by the incorporation of a fluorescent material in larger quantity as compared to the material used for ultraviolet absorption.

DETAILED DESCRIPTION OF THE DISCLOSED EMBODIMENTS

There are several commonly available systems that are essentially ultraviolet transparent and therefore unaffected by ultraviolet exposure. These include acrylics, urethanes, polysiloxanes, and to a lesser degree, phenoxy resins.

The two main classes of ultraviolet inhibitors are benzotriazoles and benzophenones. The benzophenone class tends to be very yellow when used in concentrations that efficiently block ultraviolet transmission. The benzotriazoles typically block ultraviolet transmission up to 365 nm and a few of them will block ultraviolet radiation up to 380 nm.

Including a fluorescent material that converts long wavelength ultraviolet into longer wavelength blue light will increase the ultraviolet blocking efficiency up to 400 nm. The inclusion of fluorescent material may not be necessary if the light source is a man-made light source which does not emit the longer wavelengths of ultraviolet light.

The phenoxy resin systems can be cross-linked with typical cross linkers for hydroxy-functional resins, such as melamine, urea-formaldehyde, heat reactive phenolica, and isocyanate-flnctional prepolymers.

Dipping, spraying, flow coating, curtain coating, or any other liquid coating application technique can apply these coatings. The following examples are illustrated. Proportions are by weight of resin solids.

EXAMPLE 2-1

| Glass and plastic surfaces | |
| --- | --- |
| 1. Phenoxy resin, 20% (Paphen PKHC, Phenoxy Specialties, Rock Hill, South Carolina) | |
| 2. Melamine Crosslinker (Cymel 325, Cytec Industries, Inc., W. Paterson, New Jersey) | 1.6% |
| 3. Tinuvin-328 (Ciba-Geigy) | 6% |
| 4. Uvitex OB (Ciba-Geigy) | 2.5% |
| 5. Surfactant (Flurad 43, 3M Co.) | 0.001% |
| 6. Dioxolane Diluent to 100% | |

To improve adhesion to glass surfaces requires heating to 350 F. for ten minutes or longer times at lower temperatures. In some cases, the heat of an incandescent light source will be sufficient to fully crosslink this coating.

EXAMPLE 2-2

Using acrylic solids, the following formulation is suitable; proportions are by volume of resin solids.

| | | |
| --- | --- | --- |
| 1. | Acrylic resin (Acryloid A 10 S Rohm & Haas) | 20% |
| 2. | Tinuvin-328 (Ciba-Geigy) | 6% |
| 3. | Uvitex OB (Ciba-Geigy) | 2.5% |
| 4. | Surfactant (Flurad 430, 3M Co.) | 0.001% |
| 5. | Toluene or dioxolane diluent to 100% | |

To improve adhesion to glass surfaces, it may be necessary to pretreat the glass surface by etching or treating it with a hydrolyzed amino silane coupling agent, or to other commonly known techniques to provide good adhesion to glass.

The Uvitex OB may be omitted if complete ultraviolet absorption is not required. Using the Tinuvin 328 alone at the described concentration to resin solids will produce an ultraviolet cut-off at 380–384 nm at a 9-micron film thickness.

These coatings may be further protected by overcoatings for additional chemical resistance or abrasion resistance. Some examples are aliphatic urethanes and polysiloxanes.

The described embodiments relate to a thin coating that can be applied to either the inside surface of, or the outside surface of light sources or display window. As discussed above, ultraviolet light is the primary cause of photo degradation of may exposed items. It is the primary cause of colors fading, paints chalking, paintings cracking, fabrics fading, and the loss of physical properties such as tensile and impact strength of many materials. Ultraviolet is defined as light having a wavelength of 400 nm or less.

The current technology reduces the photodegradation effect of ultraviolet light by including ultraviolet inhibitors in the body of materials to be protected or by overcoating the products with ultraviolet resin systems. Most ultraviolet inhibitors block or absorb ultraviolet radiation up to 380 nm in coatings that are at least one nm thick. Thinner films usually absorb considerably less ultraviolet not only in optical density, which is the percentage absorbed, but also not as high at 380 nm. The most common absorption cut off is 360 nm.

Articles formed from materials that have ultraviolet inhibitors included still have photodegradation at the surface. Absorption efficiency is determined by the absorption characteristics of the inhibitor and is directly related to concentration and thickness. The thinner the film, the higher the required percentage of ultraviolet absorption material required. For example, a 9 micron film may require 30% based on resin solids for efficient blocking. Most ultraviolet inhibitors will impair transparency when included in clear coatings at that level or they will degrade the physical properties of the coating resin system.

An example of an application is light sources in museums. Museums are very cautious about picture taking and light source relative to artwork or artifacts. All incandescent light sources emit ultraviolet radiation, as do all fluorescent light sources. Coating the surface of the emitting source with a total ultraviolet blocking coating protects all items exposed to that source. Electronic flashes are normally provided with a focusing lens which can be coated to completely block ultraviolet thus making them safe in museum and art galleries. Preferably, this coating is done on the inner surface of such lenses.

EXAMPLE 2-3

A Melamine Crosslinked Flexible Resin System

Proportions are by volume of resin solids.

1. Paphen phenoxy resin PKHC range 10%–40% (Phenoxy Specialties, Rock Hill, S.C.)
2. Cymel 303 melamine resin—range 2%–10% (Cytec Industries, Long Beach, N.Y.)
3. P-toluene sulfuric acid catalyst—range 0.001-%–0.1%
4. Uvitex OB—range 1%–6% (Ciba-Geigy) Optical brightener
5. Tinuvin 328—range 0.2%–4% (Ciba-Geigy) U.V. absorber
6. Solvents for dilution to create the desired film thickness, including methyl ethyl ketone, dioxolane, toluene and others to make 100%.

The above formulation has excellent tensile strength. These properties are of particular value when the coating is applied to a glass light bulb. The coated bulb will tend to be held together when the bulb is broken, for improved safety.

EXAMPLE 2-4

A Melamine Resin System

Cymel 303 solids—range 20%–50% (Cytec Industries)
P-toluene sulfuic acid catalyst—range 0.01%–0.3%
Uvitex OB—range 1%–8% (Ciba-Geigy)
Tinuvin 328—range 0.1%–4% (Ciba-Geigy)
Solvents for dilution to achieve film thickness, including toluene, xylene, methyl ethyl ketone, dioxolane and others to make 100%.
Either sample will cure at temperatures of 250 F. -350 F., with shorter times for higher temperatures.

The primary material that blocks most of the ultraviolet light and converts it to visible light is the Uvitex OB in sufficient quantities ranging from 0.1% to as much as 8%. As indicated by the following graph, this light appears as visible light in the range of 420 nm to 575 nm, with peaks at 440 nm and 490 nm. This result was obtained by coating a standard 20 watt fluorescent tube to 9 nm thickness. It has been determined that in the case of incandescent and fluorescent lamps, the covered ultraviolet light may range to as much as 30 percent to 50 percent of the total light output.

Absorption of ultraviolet radiation up to 380 nm employs a standard ultraviolet absorber. Absorbing up to 380 nm is not a requirement. It may be less than 340 nm provided that the fluorescent material makes up the difference. The fluorescent material converts ultraviolet radiation from about 340 to 400 nm to visible light. This provides a complete ultraviolet cutoff with almost any commercially available ultraviolet absorber combined with a fluorescent material.

If intense ultraviolet radiation reaches the disclosed blocking system, it may cause a glow from the fluorescent material. However, two steps can prevent the glow using a two-layer coating system, and using a slower drying solvent such as acetylacetone, or similar solvents such as xylene. A requirement is that the solvent dry slowly, and must be compatible with the resin system, the ultraviolet absorber, and the fluorescent material.

This can also be accomplished in a single solvent system as thin as 2 microns. The lower film thickness is provided by increasing the percentage of ultraviolet blocking materials to 40 percent based on resin solids. This is useful, for example, in dye transfer sublimation, where low film thicknesses are absolutely necessary to transfer the coating from a film to the surface of an image.

EXAMPLE 2-5

| A 2 Micron Example | | |
|---|---|---|
| 1. | Acryloid A21 (Rohm & Haas) at 7% solids | 22.94% |
| 2. | Tinuvin 328 (Ciba-Geigy) | 1.18% |
| 3. | Uvitex OB (Ciba-Geigy) | 1.62% |
| 4. | FSN 100 (Zonyl surfactant, Dupont) | 0.1% |
| 5. | Acetylacetone | 8% |
| 6. | Toluene | 37.05% |
| 7. | Methyl isobutyl ketone, or methyl ethyl ketone | 37.05% |

If the film thickness is increased to 9 microns, the level of ultraviolet blocking materials is decrease to 19 percent based on resin solids.

High temperature resin systems can be used with the disclosed system for application to high temperature light sources. Another embodiment is to provide a hybrid lightbulb, one that is coated with a fluorescent material on its outside surface to convert the ultraviolet emission of the bulb in to visible light. No ultraviolet absorber is necessary unless it is necessary to remove the ultraviolet radiation below 340 nm. The object of this embodiment is to increase visible light by converting ultraviolet light into visible light. A side effect is that the conversion also blocks the ultraviolet from about 340 nm and higher. If it is also necessary to block lower ultraviolet wavelengths, then an ultraviolet absorber must be used with the fluorescent material.

Each of these coatings uses a binder resin. The properties of the binder resin allow these coatings to be use din different applications. For example, the bulb coating can be made with a fluorescent material and a high temperature resin such as GR 150 or GR 908 (polysiloxane resin, from Techneglas). These resins can withstand very high temperatures for extended periods of time. These resins can also be used on high intensity halogen bulbs, which have a very high ultraviolet emission. For low temperature applications, such as a fluorescent bulb, acrylic resin can be used. IN such applications, it is not a requirement to use an ultraviolet absorber in the lightbulb coating, merely a fluorescent material.

The concentration of fluorescent material is optimized in the following example:

EXAMPLE 2-6

A Bulb Coating Formulation

GR 150 (Techneglas, Long Beach, N.Y.) at 15% solids
MIBK/Toluene 50150% we weight
Acetylacetone 8% of total weight
Uvitex OB 19% based upon GR 150 solids
BYK 330 (BYK Chemie, Middletown, Conn.) 0.5% based on resin solids

EXAMPLE 2-7

Using the proportions of Example 6, GR 150 is substituted by G.R. 908 (Techneglas).

It will be appreciated that a variety of ultraviolet absorbing materials may be used in conjunction with an optical brightener which will be operative to cover the range commencing t the wavelength where the ultraviolet absorber ceases to operate, to provide a substantially complete cutoff.

the relative output of a coating versus an uncoated 20 watt fluorescent tube. In the case of the uncoated lamp, radiation commences at about 330 nm, with the bulk of the light put output extending between that point and 425 $\mu$m. There are peak outputs at 440 nm, 550 nm, and 575 nm.

By contrast, the coated lamp has substantially all radiation up to about 415 nm completely blocked, with the visible output commencing at about 420 nm and extending 30 to about 570 nm. It will be observed that there is an area commencing at 425 nm where the curve crosses and extends above that for the uncoated lamp to about 570 run, indicating that a portion of the ultraviolet light has been converted to the visible light spectrum.

I wish it to be understood that I do not consider the invention to be limited to the precise details disclosed in the specification, for obvious modifications will occur to those skilled in the art to which the invention pertains.
General Embodiment 3

SUMMARY OF THE INVENTION

The ultraviolet block material of the present invention, has transmittance of the light within a range of wavelength of 300–380 nm of 10% or less, preferably transmittance of the light within a range of wavelength of 300–390 nm of 10% or less and, particularly preferably, transmittance of the light within a range of 300–400 nm of 10% or less while it has a transmittance of the light within a range of 420–800 nm wavelength of 90% or more or, preferably, 95% or more.

Especially when the transmittance of ultraviolet light within a range of 350–380 nm wavelength, preferably 350–390 nm or, particularly preferably, 350–400 nm wavelength is too high, such ultraviolet light decomposes the colorant whereby it is not possible to effectively prevent color fading, discoloration and decolorization.

When the transmittance of light within a range of 420–800 nm is too low, the ultraviolet block material is colored or the transparency thereof is lowered disadvantageously.

BRIEF DESCRIPTION OF THE DRAWINGS

FIG. 4 is an example where the ultraviolet block layer of the present invention is provided on a color sheet which is used for a thermal transfer printing or the like.

In the drawings, 1 is an ultraviolet block material; 2 is a substrate: 3 is an ultraviolet block layer; 4 is a layer containing a fluorescent material; 5 is a layer existing between the substrate and the layer containing a fluorescent material; 6 is a layer existing at the side, opposite to the substrate, of the layer containing the fluorescent material; 7 is an adhesive layer; 8 is a material to be layered; 9 is a side of a material to be layered where the image is formed; 10 is a color sheet; Y is a color material layer containing a yellow colorant; M is a color material layer containing a magenta colorant; C is a color material layer containing a cyan colorant; and OC is an ultraviolet block layer of the present invention.

DETAILED DESCRIPTION OF THE PREFERRED EMBODIMENTS

The ultraviolet block material of the present invention usually contains an ultraviolet radiation absorber and a fluorescent material.

Ultraviolet Radiation Absorber

With regard to an ultraviolet radiation absorber, that which mainly absorbs the light within a range of 300–380 nm may be exemplified and that of a benzophenone type, a benzotriazole type, a salicylic acid type and a hydroquinone type can be used. Preferably, a benzophenone type and a benzotriazole type are used and, particularly preferably, a benzotriazole type is used.

Examples of a benzophenone type are 2-hydroxy-4-n-octoxybenzophenone such as CHIMASSORB 81 FL (a product of Ciba-Geigy); 2-hydroxy-4-methoxy-2'-carboxybenzophenone; 2,4-dihydroxybenzophenone; 2,2'-dihydroxy-4,4'-dimethoxy-benzophenone such as Uvinul D-49 (a product of BASF); 2-hydroxy-4-benzoyloxybenzophenone; 2,2'-dihydroxy-4-methoxy-benzophenone such as Cyasorb UV-24 (a product of ACC); 2-hydroxy-4-methoxy-5-sulfonebenzophenone; 2,2',4,4'-tetrahydroxybenzophenone; 2,2'-dihydroxy-4,4'-dimethoxy-5-sodium sulfonebenzophenone; 4-dodecyloxy-2-hydroxybenzophenone; and 2-hydroxy-5-chlorobenzophenone and the like.

Examples of a benzotriazole type are 2-(5'-methyl-2'-hydroxyphenyl)benzotriazole such as Tinuvin P (a product of Ciba-Geigy); 2-(2'-hydroxy-5'-tert-butylphenyl)-benzotriazole such as Tinuvin PS (a product of Ciba-Geigy); 2-[2'-hydroxy-3',5'-bis($\alpha,\alpha$-dimethylbenzyl)-phenyl]-2H-benzotriazole such as Tinuvin 234 (a product of Ciba-Geigy); 2-(3',5'-di-tert-butyl-2'-hydroxyphenyl)-benzotriazole such as Tinuvin 320 (a product of Ciba-Geigy); 2-(3'-tert-butyl-5'-methyl-2'-hydroxyphenyl)-5-chlorobenzotriazole such as Tinuvin 326 (a product of Ciba-Geigy); 2-(3',5'-di-tert-butyl-2'-hydroxyphenyl)-5-chlorobenzotriazole such as Tinuvin 327 (a product of Ciba-Geigy); 2-(3',5'-di-tert-amyl-2'-hydroxyphenyl)-triazole such as Tinuvin 328 (a product of Ciba-Geigy); 5-tert-butyl-3-(5-chloro-2H-benzotriazol-2-yl)-4- hydroxybenzenepropionic acid octyl ester such as Tinuvin 109 (a product of Ciba-Geigy); and 2-(2'-hydroxy-3,5-di-(1,1'-dimethylbenzyl)phenyl)-2H-benzotriazole such as Tinuvin 900 (a product of Ciba-Geigy) and the like.

Examples of a salicylic acid type are phenyl salicylate such as Seesorb 201 (a product of Shiraishi Calcium); p-tert-butyl salicylate such as Sumisorb 90 (a product of Sumitomo Chemical); and p-octylphenyl salicylate (a product of Eastman Chemical) and the like. Examples of a hydroquinone type are hydroquinone and hydroquinone salicylate and the like.

Amount of the ultraviolet radiation absorber used for the base material is usually not less than 5% by weight, preferably not less than 6% by weight or, more preferably not less than 10% by weight and usually not more than 30% by weight or, preferably, not more than 25% by weight. When the amount of the ultraviolet radiation absorber is too small, it is not possible to make the light transmittance of ultraviolet region 10% or less while, when it is too much, there is a possibility that the ultraviolet radiation absorber bleeds out.

Fluorescent Material

A fluorescent material is that which absorbs ultraviolet light of a wavelength region of 340–400 nm and emits the light within a range of 400–500 mn. A fluorescent material absorbs the long-wave region of ultraviolet light and, therefore, fading, discoloration and decolorization of the colorant can be effectively prevented when a fluorescent material is contained.

Examples of a fluorescent material are materials of a diaminostilbene type, an imidazole type, a thiazole type, an oxazole type (such as 2,5-bis[5-tert-butylbenzoxazol-2-yl] thiophene [Uvitex OB, a product of Ciba-Geigy]), a triazole type, an oxadiazole type, a thiadiazole type, a coumarin type, a naphthalimide type, a pyrazoline type, a pyrene type, an imidazolone type, a benzidine type, a diaminocarbazole type, an oxacyanine type, a methine type, a pyridine type, an anthrapyridazine type, a distyryl type and a carbostyryl type and the like. Preferably, an oxazole type is used.

Amount of the fluorescent material contained for the base material is usually not less than 3% by weight, preferably not less than 6% by weight or, more preferably, not less than 10% and usually not more than 30% by weight or, preferably, not more than 25% by weight. When the amount of the fluorescent material is too small, it is not possible to make the light transmittance of ultraviolet region of not shorter than 380 nm 10% or less while, when it is too much, there is a possibility that the fluorescent material bleeds out.

Examples of the base material constituting the ultraviolet block material are synthetic resin, oil, gelatin and starch, which are not colored at the visible light region, and, usually, resin is used. Any resin may be used so far as it can be made into film or can form a resin layer as a result of drying and/or hardening when applied on a substrate. To be more specific, polyester resin, polystyrene resin, acrylate resin, polyurethane resin, acrylurethane resin, vinyl chloride resin, polyamide resin, vinyl acetate resin, epoxy resin, phenoxy resin, and cellulose type resin may be exemplified.

Overcoat

Figure 2:
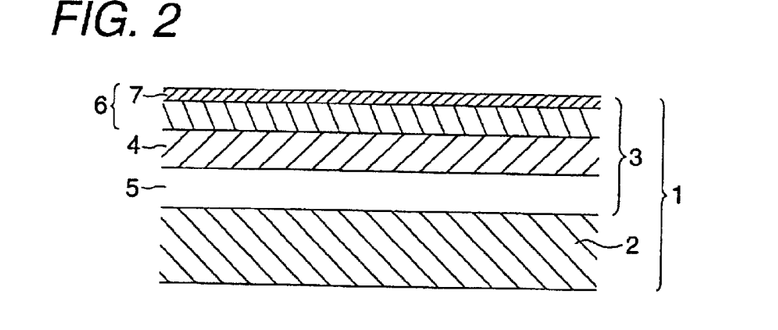
FIG. 2 is an example of the ultraviolet block material of the present invention.

As shown in FIG. 2, an embodiment of the ultraviolet block material of the present invention is in such a structure having a substrate 2 and an ultraviolet block layer 3 which is provided on the substrate in a releasable manner.

Such an ultraviolet block material 1 can be adhered on a material 8 to be transferred by, for example, the following manner.

Figures 3A, 3B:
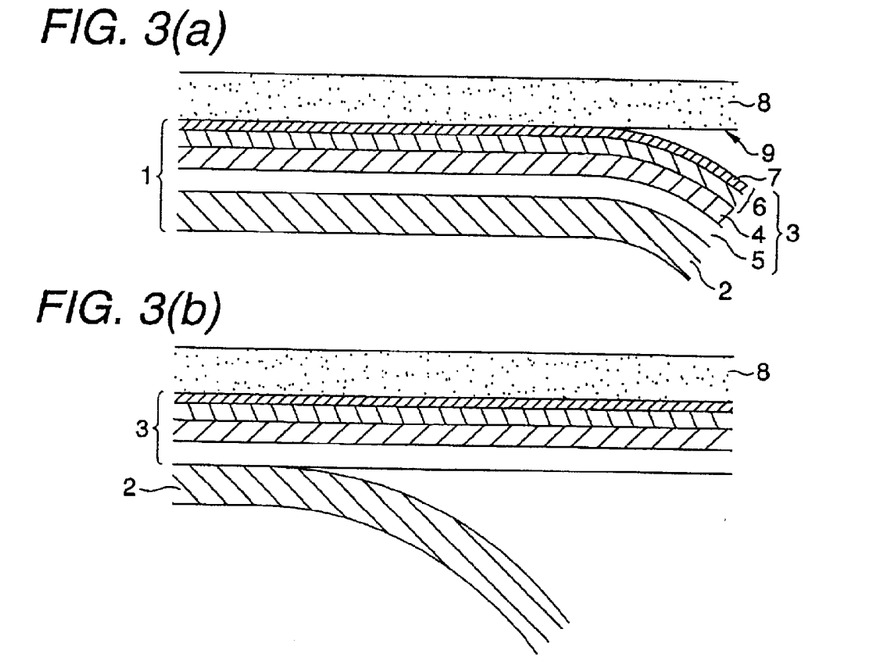
FIG. 3 is an example of a method for the protection of a material to be layered, using the ultraviolet block material of the present invention.

First, as shown in FIG. 3(a), the farthest side of the ultraviolet block layer 3 of the ultraviolet block material 1 from the substrate is layered on a material 8 to be attached. The farthest side of the ultraviolet block material from the transcription layer usually has an adhesive layer 7 for making the adhesion with the material to be transferred better. When an image is formed on the surface of the material to be transferred, the side 9 on which the image is formed is piled on the ultraviolet block material so as to contact the farthest side from the substrate of the ultraviolet block layer thereof.

After that, the ultraviolet block layer and the material to be transferred are adhered by means of heating or pressurization.

Finally, as shown in FIG. 3(b), the substrate 2 is separated from the ultraviolet block layer 3 whereby only ultraviolet block layer 3 is adhered on the material 7 to be transferred. A method where only an ultraviolet block layer is layered on the material to be transferred as such is called overcoat.

In an ultraviolet block material comprising a substrate and an ultraviolet block layer provided on the substrate in a releasable manner, the layer which is farthest from the substrate of the ultraviolet block layer may be a layer for receiving color materials. When the layer which is farthest from the substrate of the ultraviolet block layer is a color material-receiving layer, it is possible that image is formed on the color material-receiving layer of the ultraviolet block material of the present invention by means of an ink jet printing method, a thermal transfer printing method or the like, then the color material-receiving layer and the substrate paper are layered so as to be contacted, the ultraviolet block layer and the substrate paper are stuck, then the ultraviolet block layer and the substrate paper are adhered by means of heating or pressurization and the substrate is separated from the ultraviolet block layer whereupon a protected image can be formed.

Overcoat: 1

One of the preferred embodiments in an ultraviolet block material comprising a substrate and an ultraviolet block layer provided on the substrate in a releasable manner is a structure in which the ultraviolet block layer has a layer containing a fluorescent material, the layer containing the fluorescent layer has at least one layer between it and the substrate and there is also at least one layer on the layer containing the fluorescent material at its side opposite to the substrate and, in addition, any of the layers contains an ultraviolet radiation absorber.

As a result of having such a structure, the layer containing a fluorescent material does not directly contact the air even in a state where the ultraviolet block layer is present on the substrate or even in a state where the ultraviolet block layer is layered on the material to be transferred and, therefore, reduction in the ultraviolet blocking ability can be significantly suppressed. When the layer containing the fluorescent material contacts the air, the fluorescent material is decomposed by light and oxygen in air whereby the ultraviolet blocking ability lowers immediately and the ultraviolet block material allows the transmittance of ultraviolet light of near 350–380 nm wavelength.

When at least one layer among the layers between the substrate and the layers containing a fluorescent material contains an ultraviolet radiation absorber, the outcome is that the ultraviolet radiation absorber is present outside of the layer containing the fluorescent material under such a state that the ultraviolet block layer is adhered on the material to be transferred. Accordingly, especially in case the material to be transferred is an image, ultraviolet light at first passes through the layer containing the ultraviolet radiation absorber and then arrives the layer containing the fluorescent material whereby the amount of the ultraviolet light arriving the layer containing the fluorescent material can be reduced and the decomposition of the fluorescent material by ultraviolet light can be effectively prevented.

Preferably, the layer containing the fluorescent material contains an ultraviolet radiation ab sorber. When the layer containing the fluorescent material contains an ultraviolet radiation absorber, that is preferred in such a respect that the amount of ultraviolet light affecting the fluorescent material can be reduced as same as in the above-mentioned case.

Particularly preferred one is a structure where an ultraviolet radiation absorber is contained in a layer containing the fluorescent material and also at least in one layer among the layer existing between the substrate and the layer containing the fluorescent layer. Such a structure is preferred in such a respect that the ultraviolet light affecting the fluorescent material can be further reduced.

Overcoat: 2

Another preferred embodiment in an ultraviolet block material comprising a substrate and an ultraviolet block layer provided on the substrate in a releasable manner is that the ultraviolet block layer comprises a layer containing a fluorescent material and that the layer containing the fluorescent material contains an ultraviolet radiation absorber and a stabilizer.

In such a structure, the stabilizer is present in a layer containing the fluorescent material and, therefore, decomposition of the fluorescent material by ultraviolet light and by oxygen can be effectively suppressed.

It is preferred in the above structure that the structure has at least one layer between a substrate and a layer containing the fluorescent material or that the structure has at least one layer on the side, opposite to the substrate, of the layer containing the fluorescent material.

Particularly preferred structure is that there is at least one layer between the substrate and the layer containing the fluorescent material and further that there is at least one layer on the side, opposite to the substrate, of the layer containing the fluorescent material.

In case where there is at least one layer between the substrate and the layer containing the fluorescent material, it is preferred that an ultraviolet radiation absorber is contained at least in one of the layers existing between the substrate and the layer containing the fluorescent material.

Overcoat: 3

Another preferred embodiment in the ultraviolet block material comprising a substrate and an ultraviolet block layer provided on the substrate in a releasable manner is a structure in which the ultraviolet block layer has a layer containing a fluorescent material and at least one layer containing an ultraviolet radiation absorber between a substrate and a layer containing a fluorescent material and, in addition, the layer containing the fluorescent material contains a stabilizer.

In this structure, the layer containing a fluorescent material contains a stabilizer and, therefore, decomposition of the fluorescent material can be prevented. Further, since there is a layer containing an ultraviolet radiation absorber between a substrate and a layer containing a fluorescent material, the result is that, under a state that the ultraviolet block layer is adhered on the material to be transferred, the ultraviolet radiation absorber is present outside the layer containing the fluorescent material. Accordingly, especially when the material to be transferred is image, ultraviolet light firstly passes through the layer containing the ultraviolet radiation absorber and then arrives the layer containing the fluorescent material and, therefore, the amount of ultraviolet light arriving the layer containing the fluorescent material can be reduced and decomposition of the fluorescent material by ultraviolet light can be effectively prevented.

In this structure, it is preferred that the structure is in such a manner that there is at least one layer on the side, opposite to the substrate, of the layer containing the fluorescent material.

Laminate

One of the embodiments of the ultraviolet block material of the present invention is a structure as shown in FIG. 2 that there are a substrate 2 and an ultraviolet block layer 3 layered on the substrate. In that case, the substrate and the ultraviolet block layer are adhered to such an extent that they are not usually detached.

Such an ultraviolet block material 1 is adhered on the material 8 to be laminated, for example, by the following manner.

First, as shown in FIG. 3A, the side, which is farthest from a substrate, of the ultraviolet block layer 3 of the ultraviolet block material 1 is piled so as to contact the material 8 to be laminated. The farthest surface of the ultraviolet block material from the substrate usually has an adhesive layer 7 in order to make the adhesion with the material to be laminated good. When an image is formed on the surface of the material to be laminated, the surface 9 on which the image is formed and the farthest side of the ultraviolet block layer of the ultraviolet block material from the substrate are piled so as to contact them.

After that, the ultraviolet block layer and the material to be laminated are adhered by means of heating or pressurization. The substrate is not separated from the ultraviolet block layer but is adhered to the material to be laminated together with the ultraviolet block layer. A method where the ultraviolet block material is adhered on the material to be laminated as such is called laminate.

In an ultraviolet block material comprising a substrate and an ultraviolet block layer adhered on the substrate, the side of the substrate opposite to the ultraviolet block layer or the farthest layer from the substrate of the ultraviolet block material may be a layer receiving color materials (or colorants). In such the case above-mentioned, it is possible to form an image protected by the ultraviolet block layer when an image is formed on the color material-receiving layer of the ultraviolet block material of the present invention by means of an ink jet printing method, a thermal transfer printing method or the like, then the color material-receiving layer and the substrate are piled so as to be contacted each other and the ultraviolet block material and the substrate are adhered.

Laminate: 1

In an ultraviolet block material comprising a substrate and an ultraviolet block layer adhered on the substrate, one of the preferred embodiments is such a structure that the ultraviolet block layer has a layer containing a fluorescent material, there is at least one layer on the side, opposite to the substrate, of the layer containing the fluorescent material and any of the layers constituting the ultraviolet block layer contains an ultraviolet radiation absorber.

In the case of laminate, after the ultraviolet block material is adhered on the material to be laminated, the substrate is not separated from the ultraviolet block layer and, therefore, there is at least one layer outside of the layer containing the fluorescent material whereby the layer containing the fluorescent material is not exposed to air both before and after adhering to the material to be laminated and the ultraviolet blocking effect can be maintained for a long period.

When at least one layer between the substrate and the layers containing a fluorescent material contains an ultraviolet radiation absorber, the outcome is that the ultraviolet radiation absorber is present outside of the layer containing the fluorescent material under such a state that the ultraviolet block layer is adhered on the material to be laminated. Accordingly, especially in case the material to be laminated is an image, ultraviolet light at first passes through the layer containing the ultraviolet radiation absorber and then arrives the layer containing the fluorescent material whereby the amount of the ultraviolet light arriving the layer containing the fluorescent material can be reduced and the decomposition of the fluorescent material by ultraviolet light can be effectively prevented.

Preferably, the layer containing the fluorescent material contains an ultraviolet radiation absorber. When the layer containing the fluorescent material contains an ultraviolet radiation absorber, that is preferred in such a respect that the amount of ultraviolet light affecting the fluorescent material can be reduced as same as in the above-mentioned case.

Particularly preferred one is a structure where an ultraviolet radiation absorber is contained in a layer containing the fluorescent material and also at least in one layer among the layer existing between the substrate and the layer containing the fluorescent layer. Such a structure is preferred in such a respect that the ultraviolet light affecting the fluorescent material can be further reduced.

Laminate: 2

Another preferred embodiment in an ultraviolet block material comprising a substrate and an ultraviolet block layer adhered on the substrate is such a structure that the ultraviolet block layer comprises a layer containing a fluorescent material and that the layer containing the fluorescent material contains an ultraviolet radiation absorber and a stabilizer.

It is preferred that the ultraviolet block layer has at least one layer between a substrate and a layer containing a fluorescent material and/or has at least one layer on the side, opposite to the substrate, of the layer containing the fluorescent material.

Preferably, it is a structure where at least one of the layers existing between a substrate and a layer containing a fluorescent material contains an ultraviolet radiation absorber.

Laminate: 3

Another preferred embodiment in the ultraviolet block material comprising a substrate and an ultraviolet block layer adhered on the substrate is a structure in which the ultraviolet block layer has a layer containing a fluorescent material and at least one layer containing an ultraviolet radiation absorber between a substrate and a layer containing a fluorescent material and, in addition, the layer containing the fluorescent material contains a stabilizer.

Preferably, it is a structure where there is at least one layer on the side, opposite to the substrate, of the layer containing the fluorescent material.

As hereunder, a substrate constituting an ultraviolet block material and an ultraviolet block material will be illustrated.

Substrate

The substrate may be anything which has been known and has some heat resistance and strength. Its examples include polyester film such as polyethylene terephthalate, polystyrene film, polypropylene film, polysulfone film, polyphenylsulfide film and polyethylene naphthalate film and preferred ones are polyester film, paraffin paper, glassine paper and condenser paper. Among the polyester film, particularly preferably used one is a polyethylene terephthalate film. Such a substrate may be either in a sheet or in a continuous film.

Especially in the case of an ultraviolet block material used for laminate, it is preferred that the transmittance of the substrate for the light within a range of 420–800 nm is 90% or more or, preferably, 95% or more.

In the case of an ultraviolet block material used for overcoat, there will be no problem even when the substrate is not transparent.

Thickness of the substrate is usually not less than 0.5 $\mu$m or, preferably, not less than 3 $\mu$m and usually not more than 100 $\mu$m, preferably not more than 50 $\mu$m or, more preferably, not more than 10 $\mu$m.

When the ultraviolet block layer is provided in a releasable manner, it is preferred that the surface of the substrate 2 or, particularly, the side 10 connecting the ultraviolet block layer has a releasing layer for making the releasing of the ultraviolet block layer good.

The releasing layer is a layer comprising a resin having a low surface energy. To be more specific, waxes, silicone resin and fluorine-containing resin; a product where the above resin is graft-bonded to the side chain of acrylate resin or butyral resin; a hardened product of modified silicone oils; a reaction product of modified silicone oil with an isocyanate compound or an epoxy compound; resin where silicone oil is mixed with resin having a good adhesion to the substrate and the like may be used. Silicone resin of a type which is hardened by ultraviolet light, silicone resin of a thermosetting type and silicone resin of a type which is hardened at room temperature may be used as well.

Thickness of the releasing layer is usually 0.02 $\mu$m or more or, preferably, 0.05 $\mu$m or more and usually 2 $\mu$m or less or, preferably, 1 $\mu$m or less.

When the ultraviolet block layer is adhered to the substrate, the surface of the substrate 2 or, particularly, the surface 10 contacting the ultraviolet block layer may have a primer layer for enhancing the adhesion with the ultraviolet block layer.

When the ultraviolet block layer is adhered to the substrate, it is preferred that there is an abrasion-resisting layer at the substrate surface which is opposite to the layer to be adhered. The abrasion-resisting layer is a resin layer having excellent mechanical strength and slipping property.

To be more specific, silicone resin and fluorine resin; a product where silicone resin or fluorine resin is subjected to a graft bonding to polycarbonate, butyral resin or acrylate resin; a hardened product of modified silicone oils; a reaction of product of a modified silicone oil with an isocyanate compound or an epoxy compound; resin having a high mechanical strength by mixing with silicone oils; etc. may be used as a binder. Particles may be added to such a binder for reducing contacting area. With regard to the particles, those which are transparent in a visible region and are transparent when mixed with a binder are selected. Specific examples thereof are silicone particles, silica particles and resin particles. It is preferred that the refractive index of the particles is near that of the binder because transparency of the abrasion-resisting layer becomes high by that. With regard to the resin particles, those which are three-dimensionally cross-linked are preferred for preventing their swelling when dispersed in common organic solvents.

Thickness of the abrasion-resisting layer is usually 0.1 µm or more or, preferably, 0.5µ or more and usually 15 µm or less or, preferably, 5 µm or less.

Ultraviolet Block Layer

Total thickness of the ultraviolet block layer is usually 0.1 µm or more or, preferably, 0.5 µm or more and usually 5 nm or less, preferably 20 µm or less, more preferably, 10 µm or less, particularly preferably 9 µm or less or, most preferably, 6 µm or less. Especially when the ultraviolet block material or the ultraviolet block layer of the present invention is layered on the surface of the image, it is usually 10 µm or less, preferably 9 µm or less or, more preferably, 6 µm or less. Particularly when only the ultraviolet block layer is layered on the material to be transferred, the ultraviolet block layer is hardly cleaved if the ultraviolet block layer is too thick while, when it is too thin, the ultraviolet block layer may be cracked.

In the ultraviolet block layer, the transmittance of the light within a range of 300–380 nm wavelength region is 10% or less, preferably that within a range of 300–390 nm is 10% or less or, particularly preferably, that within a range of 300–400 nm is 10% or less and the transmittance of the light within a range of 420–800 nm is 90% or more or, preferably, 95% or more.

Usually, a layer containing a fluorescent material constituting an ultraviolet block layer comprises a base material and a fluorescent material.

As to the base material of the layer constituting the fluorescent material, resin is usually used. Examples of the resin are those mainly comprising ethyl cellulose, vinyl acetate resin and derivatives thereof, polyolefin, ethylene-vinyl acetate copolymer, acrylate resin and derivatives thereof, polystyrene and copolymers thereof, polyisobutylene, hydrocarbon resin, polyamide resin, polyester resin, polyurethane resin, acryl-urethane resin, epoxy resin, phenoxy resin, and cellulose type resin and other thermoplastic resins.

Thickness of the layer containing the fluorescent material is usually not less than 0.5 µm and usually not more than 10 µm, preferably not more than 9 µm or, particularly preferably, not more than 3 µm.

Examples of the fluorescent material are those which were mentioned already. The amount of the fluorescent material in the layer containing the fluorescent material is appropriately decided depending upon thickness of the layer containing the fluorescent material, titer of the fluorescent material, etc. and is usually not less than 3% by weight, preferably not less than 6% by weight or, particularly preferably, not less than 10% by weight and usually not more than 30% by weight, preferably not more than 25% by weight or, particularly preferably, not more than 20% by weight to the base material.

Thickness of the layer 5 between the substrate and the layer containing the fluorescent material is usually not less than 0.5 µm and usually not more than 10 µm, preferably not more than 9 µm or, particularly preferably, not more than 3 µm. Incidentally, when there are plural layers, the thickness means that of one layer.

With regard to the material constituting the layer existing between the substrate and the layer containing the fluorescent material, the material which is same as that used as the base material for the layer containing the fluorescent material may be used.

When the ultraviolet block layer is provided in a releasable manner on the substrate and there is no releasing layer on the surface of the substrate contacting ultraviolet block layer, it is preferred that the surface nearest the substrate among the layers 5 between the substrate 2 and the layer 4 containing the fluorescent material is a releasing layer.

The releasing layer is peeled together with the ultraviolet block layer from the substrate. The releasing layer is a layer comprising a resin having a low surface energy. To be more specific, there may be used wax, silicone resin, fluorine-containing resin; a product where the above resin is graft-bonded to the side chain of acrylate resin or butyral resin; a hardened product of modified silicone oils; a reaction product of modified silicone oil with an isocyanate compound or an epoxy compound; a resin where silicone oil is mixed with a resin having a good adhesion to the substrate; etc. An ultraviolet-setting silicone resin, a thermosetting silicone resin and a silicone resin setting at room temperature may be advantageously used as well. A product where these resins are compounded to particles is preferably used.

Thickness of the releasing layer is usually not less than 0.02 µm or, preferably, not less than 0.05 µm and usually not more than 2 µm or, preferably, not more than 1 µm.

Thickness of the layer which is in an opposite side of the substrate to the layer containing a fluorescent material is usually not less than 0.5 µm and usually not more than 10 µm, preferably not more than 9 µm or, particularly preferably, not more than 3 µm. Incidentally, when there are plural layers, the thickness means that of one layer.

With regard to the material constituting the layer which is in an opposite side of the substrate to the layer containing the fluorescent material, the substance which is same as that used as the base material for the layer containing the fluorescent material may be used.

It is preferred that the layer 6 farthest from the substrate among the layers provided on the side, opposite to the substrate, of the layer containing the fluorescent material is an adhesive layer 7 having an adhesive property by means of heating or pressurization because, even when the surface of the material to be layered has no adhesive layer, adhesion to the material to be layered is strong. An example of the adhesive layer is a layer comprising a heat-sensitive adhesive and an example of the heat-sensitive adhesive is a resin having substantially no stickiness and having a glass transition point (Tg) of 40–75° C. as described in the Japanese Patent No. 2,999,515. Specific examples are those resins having a good adhesion upon heating such as acrylate resin, polyvinyl chloride resin, polyvinyl acetate resin, vinyl chloride-vinyl acetate copolymer or polyester resin. Thickness of the adhesive layer is usually not less than 0.1 µm and not more than 10 µm.

With regard to a color material-receiving layer which is provided in the case of a direct formation of image on an ultraviolet block material, a color material-receiving layer which is suitable for each image forming method such as dye sublimation or dye diffusion thermal transfer, wax type thermal transfer and ink jet may be appropriately selected.

With regard to a color material-receiving layer for a dye sublimation or dye diffusion thermal transfer, known ones may be used and its main component is a thermoplastic resin which is able to receive a thermally sublimating or diffusing dye from a thermal transfer sheet. To be more specific, polyester resin, acrylate resin, polystyrene, styrene type homopolymer, acrylstyrene copolymer, polycarbonate, polysulfone, polyvinylpyrrolidone, polyamide resin, polyvinyl acetal resin, polyvinyl alcohol resin, polyvinyl chloride, polyvinyl acetate, vinyl chloride-vinyl acetate copolymer, phenoxy resin, epoxy resin, cellulose ester resin, silicone resin and fluorine resin and the like may be exemplified. Besides those resins, it is possible to add various kinds of plasticizer as well as peeling agents and stabilizers which will be mentioned later.

Examples of a peeling agent are modified silicone oils and a reaction product of modified silicone oil with an isocyanate compound and an epoxy compound.

It is also possible that a color material-receiving layer is cross-linked in a three-dimensional manner for improving the peeling from the thermal transfer sheet and for improving the heat resistance.

In this case, thickness of the color material-receiving layer is usually not less than 1 μm or, preferably, not less than 2 μm and usually not more than 10 μm or, preferably, not more than 5 μm.

With regard to a color material-receiving layer of a wax type thermal transfer, known porous receiving layer and receiving layer having no fine pores may be exemplified.

Examples of the porous receiving layer are those containing a water-dispersible polyurethane resin and, if necessary, pigment as main component(s).

Thickness of the color material-receiving layer in this case is usually not less than 0.5 μm or, preferably, not less than 0.8 μm and usually not more than 20 μm or, preferably, not more than 10 μm.

With regard to a color material-receiving layer for an ink jet method, layers comprising known water-soluble resin and water-insoluble resin may be exemplified. A receiving layer comprising a water-soluble resin is preferred.

With regard to the water-soluble resin, there may be used gelatin, polyvinylpyrrolidone, polyethylene oxide, polyacrylamide, polyvinyl alcohol, terminal-modified polyvinyl alcohol, etc. may be used. Such a resin may be compounded with known additives or resin for giving a luster.

When the color material-receiving layer is porous, organic or inorganic fine particles are added for forming fine pores in the color material-receiving layer. Preferably, inorganic fine particles are used and, particularly preferably, white inorganic pigment or the like is used.

Amount of a coating for the color material-receiving layer is usually not less than 0.3 g/m$^2$, particularly not less than 1 g/m$^2$ or, particularly preferably not less than 2 g/m$^2$ and usually not more than 30 g/m$^2$, preferably not more than 25 g/m2 or, particularly preferably, not more than 20 g/m$^2$.

In a direct formation of image on an ultraviolet block material, although there is no particular limitation for the substrate paper which is layered on the ultraviolet radiation block material of the present invention, there may be used synthetic paper comprising the resin of polyolefin type, polystyrene type, polyester type, etc. and white non-transparent film or foamed sheet; various paper materials such as high quality paper, art paper, coated paper, cast coated paper, paper impregnated with synthetic resin or emulsion, paper impregnated with synthetic rubber latex, paper lined with synthetic resin, cellulose fiber paper and resin-coated paper where at least one side of the paper has a polyolefin resin-coated layer to which pigment or the like is added (the so-called RC paper); various kinds of plastic films and sheets such as polyolefin, polyvinyl chloride, polyethylene terephthalate, polystyrene, polymethacrylate and polycarbonate etc.; and cards made of polyvinyl chloride or the like. When the substrate paper has a poor tight adhesion to the color material-receiving layer, it is preferred to subject its surface to a primer treatment or a corona discharge treatment.

Thickness of the substrate paper is usually about 10–300 μm.

With regard to the ultraviolet radiation absorber, those which were mentioned already may be exemplified. Amount of the ultraviolet radiation absorber in the layer containing an ultraviolet radiation absorber may be appropriately decided depending upon thickness of the layer, titer of the ultraviolet radiation absorber, etc. and is usually not less than 5% by weight, preferably not less than 6% by weight or, more preferably, not less than 10% by weight and usually not more than 30% by weight, preferably not more than 25% by weight or, more preferably, not more than 20% by weight.

A stabilizer is a substance which prevents the decomposition of the fluorescent material by oxygen or ultraviolet light and it is usually contained in the same layer in which the fluorescent material is contained. Although there is no particular limitation for the stabilizer, its specific examples are antioxidant of a hindered amine type, an antioxidant of a hindered phenol type and a light stabilizer of a benzoate type and the like. An ultraviolet radiation absorber may be used as a stabilizer as well.

Examples of an antioxidant of a hindered amine type are bis(2,2,6,6-tetramethyl-4-piperidyl) sebacate such as Tinuvin 770 (a product of Ciba-Geigy); bis(1,2,2,6,6-pentamethyl-4-piperidyl) sebacate such as Tinuvin 765 (a product of Ciba-Geigy); and bis(1,2,2,6,6-pentamethyl-4-piperidyl) 2-(3,5-di-tert-butyl-4-hydroxybenzyl)-2-n-butylmalonate such as Tinuvin 114 (a product of Ciba-Geigy).

Examples of an antioxidant of a hindered phenol type are pentaerythritol tetrakis[3-(3,5-di-tert-butyl-4-hydroxyphenyl)propionate] such as Irganox 1010 (a product of Ciba-Geigy); thiodiethylenebis[3-(3,5-di-tert-butyl-4-hydroxyphenyl) propionate] such as Irganox 1035 (a product of Ciba-Geigy); octadecyl 3-(3,5-di-tert-butyl-4-hydroxyphenyl) propionate such as Irganox 1076 (a product of Ciba-Geigy); ethylenebis[3-(3,5-di-tert-butyl-4-hydroxyphenyl-m-tolyl) propionate] such as Irganox 245 (a product of Ciba-Geigy); 2,6-di-tert-butyl-4-[4,6-bis(octylthio)-1,3,5-triazin-2-ylamino]phenol such as Irganox 565 (a product of Ciba-Geigy); and 4,6-bis(octylthiomethyl)-o-cresol such as Irganox 1520 (a product of Ciba-Geigy).

Examples of a light stabilizer of a benzoate type are 2,4-di-tert-butylphenyl 3,5-di-tert-butyl-4-hydroxybenzoate such as Tinuvin 120 (a product of Ciba-Geigy) and the like.

Amount of the stabilizer to the base material in the layer containing the fluorescent material is usually not less than 1% by weight or, preferably, not less than 3% by weight and usually not more than 15% by weight or, preferably, not more than 10% by weight.

Examples of a method for the formation of each of the layers constituting the ultraviolet block layer on a substrate are gravure coating, reverse gravure coating, roll coating, etc. wherein a solution containing a base material and ultraviolet block materials and/or others for constituting each layer is applied and dried.

Each of the layers constituting the ultraviolet block layer may contain lubricant, particles, surfactant, etc.

Figure 4:
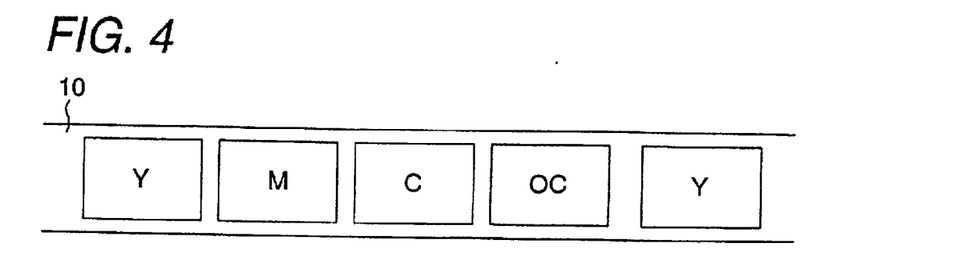

When the material to be layered is a printed image by a dye sublimation or dye diffusion thermal transfer or a wax type thermal transfer, the ultraviolet block layer may be placed in such a successive manner with the color material layers on the surface of a color sheet as shown in FIG. 4.

Examples of the material to be layered with an ultraviolet block layer or a whole ultraviolet block material of the present invention are images such as painting, ink jet printed image, dye sublimation or dye diffusion thermal transfer printed image, wax type thermal transfer printed image and electronic photographic image; glass and transparent plate, such as glass part of picture frame, window glass for cars and homes, showcase and food case; and fluorescent lamp and sleeve for fluorescent lamp.

When the ultraviolet block material of the present invention is layered on various kinds of glass and transparent plate, ultraviolet light does not reach inside them and, therefore, when it is used for a picture frame for example, it is possible to prevent color fading, discoloration, decolorization, etc. of paintings, letters, etc. in the picture frame.

Fluorescent lamp generates ultraviolet light besides the visible light. Insects such as moth have a habit of being attracted by ultraviolet light and, therefore, when the ultraviolet block material of the present invention is layered on window glass, fluorescent lamp or sleeve for fluorescent lamp, it is possible to prevent swarming of the insect.

Although there is no particular limitation for a method of adhering the ultraviolet block layer or the whole ultraviolet block material of the present invention to a material to be layered, it is preferred to adhere by means of heating or pressurization when the material to be layered is image or particularly when it is ink jet printed image, dye sublimation thermal transfer printed image, dye diffusion thermal transfer printed image, wax type thermal transfer printed image, electronic picture image, etc. When the ultraviolet block layer is be placed in such a successive manner with the color material layers on the surface of a color sheet in the case of a thermal transfer print, it is preferred that adhesion is carried out by means of heating.

With regard to a means for heating, it may be carried out by a thermal head in a printer or by hot plate, hot roll, iron, etc.

Examples of the pressurizing means are pressurizing roll, pressuring plate, etc.

EXAMPLES

In the following Examples, Acriloid A21 (an acrylate resin solution; manufactured by Rohm & Haas; a 30% solution), Bilon 103 (saturated polyester resin; manufactured by Toray), PKHC (phenoxy resin; manufactured by Phenoxy Specialties, Rock Hill, S.C.), Tinuvin 328 (ultraviolet radiation absorber; a product of Ciba-Geigy), Uvitex OB (fluorescent material; a product of Ciba-Geigy), Irganox 1076 (antioxidant of a hindered phenol type; manufactured by a product of Ciba-Geigy), Tinuvin 120 (stabilizer of a benzoate type; a product of Ciba-Geigy), 2,2'-dihydroxy-4,4'-dimethoxybenzophenone (ultraviolet radiation absorber of a benzophenone type; hereinafter, abbreviated as "DHDMOBF"), Fluorad FC-430 (surfactant of a fluorine type; a product of 3M), acetylacetone and a mixed solvent (tolune/2-butanone=1/1) were used.

EXAMPLES 1–4 AND COMPARATIVE EXAMPLES 1 and 2

A polyethylene terephthalate film (thickness: 12 $\mu$m) having a releasing layer on one side was used as a substrate and an application solution as shown in Table 1 was applied on the releasing layer using a Meyer bar. After being applied, it was dried at 120° C. for 1 minute to form an ultraviolet block layer having a thickness of 2 $\mu$m on the substrate.

Figure 1:
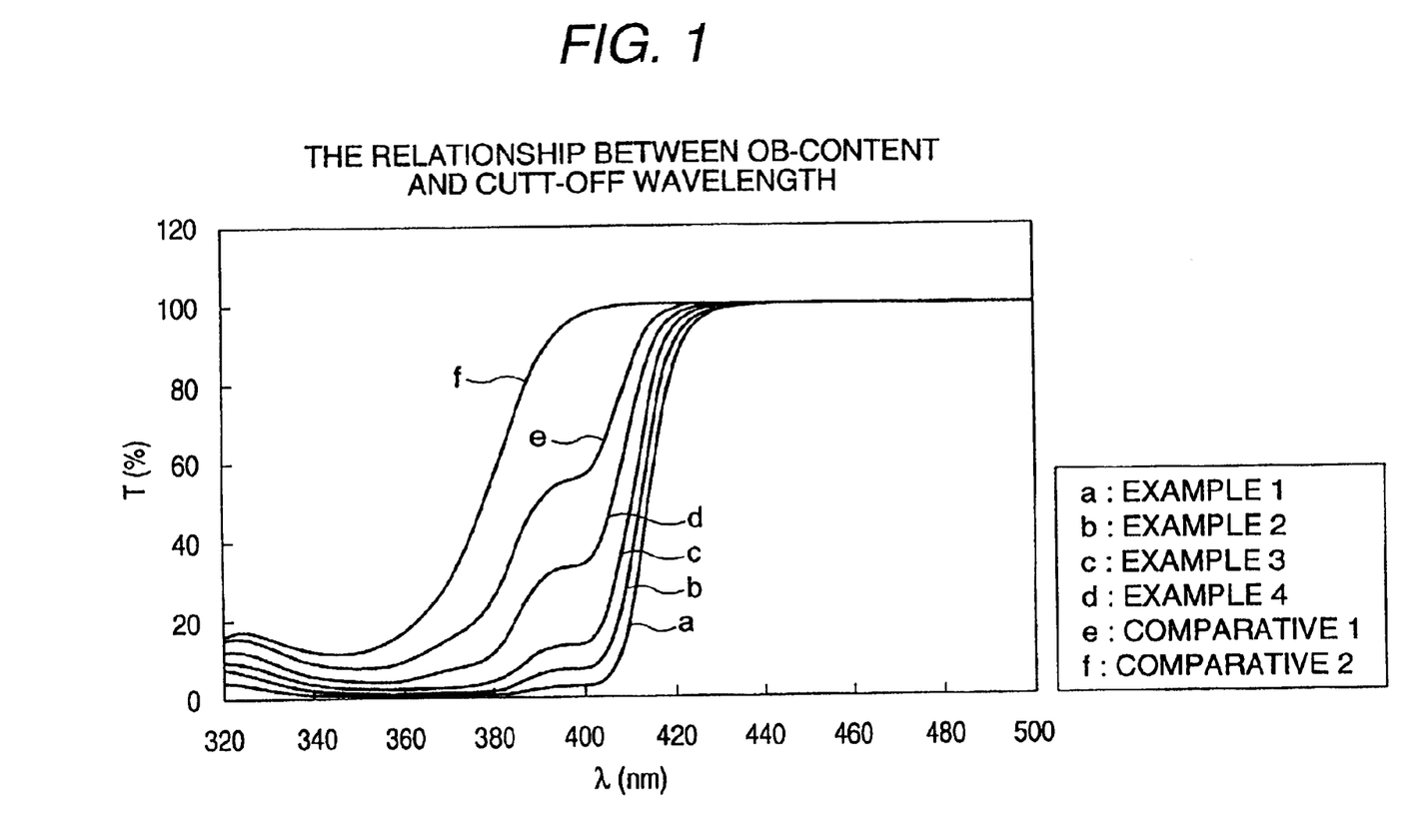
FIG. 1 is light transmittance spectra of Examples 1–4 and Comparative Examples 1 and 2.

The light transmittance spectrum of the ultraviolet block material was measured by a spectrophotometer U-3500 manufactured by Hitachi. The result is shown in FIG. 1.

TABLE 1

(In the Table, figures indicate parts by weight)

|  | Example 1 | Example 2 | Example 3 | Example 4 | Comp.Ex. 1 | Comp.Ex. 2 |
| --- | --- | --- | --- | --- | --- | --- |
| Application solution | C-1 | C-2 | C-3 | C-4 | C-5 | C-6 |
| Acriloid A21 | 26.3 | 27.3 | 28.4 | 29.5 | 30.1 | 30.8 |
| Tinuvin 328 | 1.19 | 1.23 | 1.28 | 1.33 | 1.36 | 1.38 |
| Uvitex OB | 1.58 | 1.23 | 0.85 | 0.44 | 0.23 | 0 |
| Irganox 1076 | 0.24 | 0.25 | 0.26 | 0.27 | 0.27 | 0.28 |
| FC 430 | 0.09 | 0.10 | 0.10 | 0.11 | 0.11 | 0.11 |
| Acetylacetone | 8.0 | 8.0 | 8.0 | 8.0 | 8.0 | 8.0 |
| Mixed Solvent | 62.6 | 61.9 | 61.1 | 60.3 | 59.9 | 59.5 |

EXAMPLES 5–17 AND COMPARATIVE EXAMPLE 3

Application solutions were prepared according to the compositions as shown in Table 2.

The solution was applied using a Meyer bar on a releasing layer of a polyethylene terephthalate film (thickness: 12 $\mu$m) having a releasing layer on one side as a substrate so as to give layer constitution as shown in Table 3. After being applied, it was dried at 120° C. for 1 minute to prepare an ultraviolet block material.

In Examples 6 and 10–17, the application solution was applied on a substrate and dried to form an ultraviolet block layer. Another application solution was applied on a releasing layer of a polyethylene terephthalate film (hereinafter, referred to as PET) comprising the same materials as the substrate and dried to form an ultraviolet block layer. The ultraviolet block layer on the substrate and the ultraviolet block layer on the PET were piled in a state of contacting each other so as to give the layer constitution as shown in Table 3 and preliminarily provided on an image-receiving layer surface of the image-receiving paper of a video print set (VW-APKC 36) for a printer (NV-AP-1) manufactured by Matsushita Electric Industrial) and its four corners were fixed by an adhesive tape so as not to slip off.

After that, a transparent polyethylene terephthalate film (thickness: 4.5 μm) having a heat-resisting slipping layer on one side and having no color material layer on another side was prepared and a marker similar to a color sheet of VW-APKC 36 was formed thereon followed by winding on a bobbin of a color sheet of VW-APKC 36. The color sheet was installed in a color sheet cassette of VW-APKC 36 and then installed in a printer (NV-AP-1).

In the meanwhile, the above-piled product of the image-receiving paper and the ultraviolet block material was provided in a paper cassette and the highest energy was applied to the thermal head to heat the whole surface so that they were adhered each other. After heating, the ultraviolet block material of the present invention was obtained by taking it out from the image-receiving paper on which it was preliminarily placed.

Incidentally, although the ultraviolet block layer of the present invention contacted the dye-receiving layer of the image-receiving paper upon heating, an adhesive layer was not provided on the outermost layer of the ultraviolet block layer and, therefore, it did not happen that the ultraviolet block layer adhered to the dye-receiving layer.

The ultraviolet radiation block material prepared as such was subjected to a light irradiation test from a xenon lamp using a Ci-4000 weather-o-meter manufactured by Atlas. The irradiation condition was that the irradiated light intensity at 340 nm was 0.55 w/m$^2$ and the irradiating time was 40 hours. The transmittance spectra of each sample before and after the light irradiation test from xenon lamp were measured by a spectrophotometer U-3500 manufactured by Hitachi. Result of the transmittance spectrum after the irradiation test with a xenon lamp is shown under the column of "light stability" in Table 2.

Incidentally, the light stability was judged according to the following criteria on the basis of the transmittance spectrum of each sample.

In the meanwhile, result of the transmittance spectrum before the light irradiation from a xenon lamp was very good for all of Examples 1–13 and Comparative Example 1.

very good: transmittance of the light of 380 nm was 5% or less
good: transmittance of the light of 380 nm was more than 5% and up to 10%
durable: transmittance of the light of 380 nm was more than 10% and up to 20%
no good: transmittance of the light of 380 nm was more than 20%

TABLE 2

(Figures in the Table indicate part(s) by weight)

| Application Solution | C-1' | C-6' |
|---|---|---|
| Acriloid A21 | 26.9 | 31.6 |
| Tinuvin 328 | 1.21 | 1.42 |
| Uvitex OB | 1.62 | 0 |
| FC 430 | 0.10 | 0.11 |
| Acetylacetone | 8.0 | 8.0 |
| Mixed Solvent | 62.2 | 58.9 |

| Application Solution | C-7 | C-8 | C-9 | C-10 | C-11 | C-12 |
|---|---|---|---|---|---|---|
| Acriloid A21 | 70.0 | 26.3 | 26.3 | 26.3 | 32.3 | 36.7 |
| Tinuvin 328 | 1.68 | 1.19 | 1.19 | 1.19 | 1.21 | 0 |
| Uvitex OB | 2.32 | 1.58 | 1.58 | 1.58 | 0.0 | 0 |
| Irganox 1076 | 0 | 0.24 | 0 | 0 | 0 | 0 |
| Tinuvin 120 | 0 | 0 | 0.24 | 0 | 0 | 0 |
| DHDMOBF | 0 | 0 | 0 | 0.24 | 0 | 0 |
| FC 430 | 0 | 0.09 | 0.09 | 0.09 | 0.12 | 0 |
| Acetylacetone | 0 | 8.0 | 8.0 | 8.0 | 8.0 | 0 |
| Mixed Solvent | 26.0 | 62.6 | 62.6 | 62.6 | 58.4 | 63.3 |

| Application Solution | C-13 | C-14 |
|---|---|---|
| Bilon 103 | 8.08 | 0 |
| PKHC | 0 | 8.08 |
| Uvitex OB | 1.21 | 1.21 |
| Tinuvin 328 | 1.62 | 1.62 |
| FC 430 | 0.10 | 0.10 |
| Acetylacetone | 8.0 | 8.0 |
| Mixed Solvent | 81.0 | 81.0 |

TABLE 3

| | Constitution of Ultraviolet Block Material | Light Stability |
|---|---|---|
| Example 5 | Substrate/C-7 (9 μm) | Very good |
| Example 6 | Substrate/C-7 (9 μm)/C-11 (2 μm)/PET | Very good |
| Example 7 | Substrate/C-8 (2 μm) | Good |
| Example 8 | Substrate/C-9 (2 μm) | Durable |
| Example 9 | Substrate/C-10 (2 μm) | Durable |
| Example 10 | Substrate/C-1' (2 μm)/C-11 (2 μm)/PET | Good |
| Example 11 | Substrate/C-1' (2 μm)/C-12 (2 μm)/PET | Good |
| Example 12 | Substrate/C-8 (2 μm)/C-11 (2 μm)/PET | Very good |
| Example 13 | Substrate/C-8 (2 μm)/C-12 (2 μm)/PET | Very good |
| Example 14 | Substrate/C-13 (2 μm)/C-11 (2 μm)/PET | Very good |
| Example 15 | Substrate/C-13 (2 μm)/C-12 (2 μm)/PET | Very good |
| Example 16 | Substrate/C-14 (2 μm)/C-11 (2 μm)/PET | Very good |
| Example 17 | Substrate/C-14 (2 μm)/C-12 (2 μm)/PET | Very good |
| Comparative Example 3 | Substrate/C-1' (2 μm) | No good |

EXAMPLES 18–22 AND COMPARATIVE EXAMPLE 4

The ultraviolet block material of the present invention was adhered onto the image and the light stability of the image was compared.

The ultraviolet block material was prepared by the same manner as in Example 1 so as to give the layer constitution as shown in Table 4. In the case of a layered product where the ultraviolet block layer comprises plural application solutions, the layer nearest the substrate was applied and dried and then the next layer was applied and dried whereupon the ultraviolet block layer was formed.

In the meanwhile, black (gray) which an optical density was about 1 was printed using a printer NV-AP-1 and a video printing set VW-APKC 36 for the said printer manufactured by Matsushita Electric Industrial. Then the printed image of this printed thing was piled to contact the ultraviolet block layer which was provided in a releasable manner in the ultraviolet block material on the substrate and set in the printer, and the whole surface was heated by a thermal head from the back of the color sheet using an color sheet of the video printing set. Since the substrate of the ultraviolet block material was thermally fused to the color sheet, the substrate was separated from the image-receiving layer simultaneously with the completion of the heating and only the ultraviolet block layer was layered on the image.

The image protected by the ultraviolet block layer prepared as such was subjected to a test of light irradiation from a xenon lamp using a Ci-4000 weather-o-meter manufactured by Atlas under the same condition as in Example 1.

The image before and after the light irradiation test was measured by a calorimeter of a Spectroloni type manufactured by Gretag to determine the hue change (ΔE). The result is shown in Table 4. The smaller the ΔE, the smaller the hue change and the better the light stability of the image.

In Comparative Example 4, the hue change was measured without layering an ultraviolet block layer on the image.

TABLE 4

| | Constitution of Ultraviolet Block Material | ΔE |
|---|---|---|
| Example 18 | Substrate/C-6' (2 μm) | 9.4 |
| Example 19 | Substrate/C-6' (2 μm)/C-12 (2 μm) | 4.2 |
| Example 20 | Substrate/C-11 (2 μm)/C-6' (2 μm)/C-12 (2 μm) | 3.7 |
| Example 21 | Substrate/C-1' (2 μm)/C-12 (2 μm) | 7.6 |
| Example 22 | Substrate/C-11 (2 μm)/C-1' (2 μm)/C-12 (2 μm) | 6.2 |
| Comparative Example 4 | (none) | 15.4 |

What is claimed is:

1. An ultraviolet block material comprising a fluorescent material in an amount of 5–30% by weight and an ultraviolet radiation absorber, wherein the ultraviolet block material is characterized by a transmittance for light within a wavelength range of 300–380 nm of 10% or less and a transmittance for light within a wavelength range of 420–800 nm of 90% or more.

2. The ultraviolet block material according to claim 1, wherein a transmittance for the light within a wavelength range of 300–390 nm is 10% or less.

3. The ultraviolet block material according to claim 1, wherein a transmittance for the light within a wavelength range of 300–400 nm is 10% or less.

4. The ultraviolet block material according to claim 1, wherein the ultraviolet radiation absorber is contained in an amount of 5–30% by weight.

5. The ultraviolet block material of claim 1, wherein the fluorescent material is an oxazole type fluorescent material.

6. The ultraviolet block material of claim 1, wherein the ultraviolet radiation absorber is a benzophenone type and/or a benzotriazole type ultraviolet radiation absorber.

7. An ultraviolet block material comprising a substrate and an ultraviolet block layer provided on the substrate in a releasable manner, wherein the ultraviolet block material is characterized by a transmittance for light within a wavelength range of 300–380 nm of 10% or less and a transmittance for light within a wavelength range of 420–800 nm of 90% or more.

8. The ultraviolet block material according to claim 7, wherein the ultraviolet block layer comprises a layer comprising a fluorescent material, wherein the layer comprising the fluorescent material has on a first side at least one layer between it and the substrate and also has at least one layer on a second side opposite to the substrate, and wherein any of the layers comprises an ultraviolet radiation absorber.

9. The ultraviolet block material according to claim 8, wherein at least one of the layers between the substrate and the layer comprising the fluorescent material comprises an ultraviolet radiation absorber.

10. The ultraviolet block material according to claim 8, wherein the layer comprising the fluorescent material comprises an ultraviolet radiation absorber.

11. The ultraviolet block material according to claim 8, wherein the layer comprising the fluorescent material and at least one layer between the substrate and the layer comprising the fluorescent material comprise an ultraviolet radiation absorber.

12. The ultraviolet block material of claim 8, wherein the fluorescent material is an oxazole type fluorescent material.

13. The ultraviolet block material of claim 8, wherein the ultraviolet radiation absorber is a benzophenone type and/or a benzotriazole type ultraviolet radiation absorber.

14. The ultraviolet block material according to claim 7, wherein the ultraviolet block layer comprises a layer comprising a fluorescent material, an ultraviolet radiation absorber and a stabilizer.

15. The ultraviolet block material according to claim 14, wherein the ultraviolet block layer comprises at least one layer between the substrate and the layer comprising the fluorescent material, ultraviolet radiation absorber and stabilizer.

16. The ultraviolet block material according to claim 15, wherein at least one of the layers between the substrate and the layer comprising the fluorescent material, ultraviolet radiation absorber and stabilizer comprises an ultraviolet radiation absorber.

17. The ultraviolet block material according to claim 14, wherein the ultraviolet block layer comprises at least one layer on the side, opposite to the substrate, of the layer comprising the fluorescent material, ultraviolet radiation absorber and stabilizer.

18. The ultraviolet block material according to claim 17, wherein the layer farthest from the substrate on the side, opposite to the substrate, of the layer comprising the fluorescent material, ultraviolet radiation absorber and stabilizer is an adhesive layer showing tackiness by means of heating or pressurization.

19. The ultraviolet block material according to claim 14, wherein the ultraviolet block layer comprises at least one layer between the substrate and the layer comprising the fluorescent material, ultraviolet radiation absorber and stabilizer and also comprises at least one layer on the side, opposite to the substrate, of the layer comprising the fluorescent material, ultraviolet radiation absorber and stabilizer.

20. The ultraviolet block material of claim 14, wherein the fluorescent material is an oxazole type fluorescent material.

21. The ultraviolet block material of claim 14, wherein the ultraviolet radiation absorber is a benzophenone type and/or a benzotriazole type ultraviolet radiation absorber.

22. The ultraviolet block material according to claim 7, wherein the ultraviolet block layer comprises a layer comprising a fluorescent material and at least one layer comprising an ultraviolet radiation absorber between the substrate and the layer comprising the fluorescent material, and wherein the layer comprising the fluorescent material comprises a stabilizer.

23. The ultraviolet block material according to claim 22, wherein the ultraviolet block layer comprises at least one layer on the side, opposite to the substrate, of the layer comprising the fluorescent material.

24. The ultraviolet block material according to claim 7, wherein the ultraviolet block layer comprises a plurality of layers and the layer farthest from the substrate in the ultraviolet block layer is a layer which receives color materials.

25. A method for protection from ultraviolet light, comprising forming an image on the color material-receiving layer of the ultraviolet block material of claim 24, then layering a substrate paper on the color material-receiving layer, and separating the substrate from the ultraviolet block layer.

26. A method for protecting a material to be transferred from ultraviolet light, comprising contacting the material to be transferred with the ultraviolet block material of claim 7, wherein the side of the ultraviolet block layer farthest from the substrate is layered to contact the material to be transferred, and then separating the substrate from the ultraviolet block layer.

27. The method according to claim 26, wherein a surface of the material to be transferred comprises an image is formed by an ink jet recording system or a thermal transfer printing system.

28. A material protected from ultraviolet light, which is prepared by a method of claim 26.

29. The ultraviolet block material of claim 7, wherein transmittance for light within a wavelength range of 300–390 nm is 10% or less.

30. The ultraviolet block material of claim 7, wherein transmittance for light within a wavelength range of 300–400 nm is 10% or less.

31. An ultraviolet block material comprising a substrate and an ultraviolet block layer adhered on the substrate, wherein the ultraviolet block material is characterized by a transmittance for light within a wavelength range of 300–380 nm of 10% or less and a transmittance for light within a wavelength range of 420–800 nm of 90% or more, and wherein the ultraviolet block layer comprises at least one of:
  (a) a layer comprising a fluorescent material and at least one layer on the side, opposite to the substrate, of the layer comprising the fluorescent material, wherein any of the layers comprises an ultraviolet radiation absorber; or
  (b) a layer comprising a fluorescent material, an ultraviolet radiation absorber and a stabilizer, and at least one layer between the substrate and the layer comprising the fluorescent material, the ultraviolet radiation absorber and the stabilizer.

32. The ultraviolet block material according to claim 31, wherein the ultraviolet block layer comprises a layer comprising a fluorescent material and at least one layer on the side, opposite to the substrate, of the layer comprising the fluorescent material, wherein any of the layers comprises an ultraviolet radiation absorber.

33. The ultraviolet block material according to claim 32, wherein the layer comprising the fluorescent material comprises an ultraviolet radiation absorber.

34. The ultraviolet block material according to claim 32, wherein there is at least one layer between the substrate and the layer comprising the fluorescent material.

35. The ultraviolet block material according to claim 34, wherein at least one layer between the substrate and the layer comprising the fluorescent material comprises an ultraviolet radiation absorber.

36. The ultraviolet block material according to claim 34, wherein the layer comprising the fluorescent material and at least one layer between the substrate and the layer comprising the fluorescent material comprise an ultraviolet radiation absorber.

37. The ultraviolet block material according to claim 31, wherein the ultraviolet block layer comprises a layer comprising a fluorescent material, an ultraviolet radiation absorber, and a stabilizer, and at least one layer between the substrate and the layer comprising the fluorescent material, the ultraviolet radiation absorber, and the stabilizer.

38. The ultraviolet block material according to claim 37, wherein the ultraviolet block layer comprises at least one layer on the side, opposite to the substrate, of the layer comprising the fluorescent material, the ultraviolet radiation absorber, and the stabilizer.

39. The ultraviolet block material of claim 31, wherein transmittance for light within a wavelength range of 300–390 nm is 10% or less.

40. The ultraviolet block material of claim 31, wherein transmittance for light within a wavelength range of 300–400 nm is 10% or less.

41. The ultraviolet block material of claim 31, wherein the fluorescent material is an oxazole type fluorescent material.

42. The ultraviolet block material of claim 31, wherein the ultraviolet radiation absorber is a benzophenone type and/or a benzotriazole type ultraviolet radiation absorber.

43. An ultraviolet block material comprising a substrate and an ultraviolet block layer adhered on the substrate, wherein the ultraviolet block material is characterized by a transmittance for light within a wavelength range of 300–380 nm of 10% or less and a transmittance for light within a wavelength range of 420–800 nm of 90% or more, and wherein the ultraviolet block layer comprises (i) a layer comprising a fluorescent material, an ultraviolet radiation absorber and a stabilizer, and (ii) one of:
  (a) at least one layer between the substrate and the layer comprising the fluorescent material, the ultraviolet radiation absorber and the stabilizer;
  (b) at least one layer on the side, opposite to the substrate, of the layer comprising the fluorescent material, the ultraviolet radiation absorber and the stabilizer; or
  (c) at least one layer between the substrate and the layer comprising the fluorescent material, ultraviolet radiation absorber and stabilizer, and also at least one layer on the side, opposite to the substrate, of the layer comprising the fluorescent material, ultraviolet radiation absorber and stabilizer.

44. The ultraviolet block material according to claim 43, wherein the ultraviolet block layer comprises at least one layer between the substrate and the layer comprising the fluorescent material, ultraviolet radiation absorber and stabilizer.

45. The ultraviolet block material according to claim 44, wherein at least one of the layers between the substrate and the layer comprising the fluorescent material, ultraviolet radiation absorber and stabilizer comprises an ultraviolet radiation absorber.

46. The ultraviolet block material according to claim 43, wherein the ultraviolet block layer comprises at least one layer on the side, opposite to the substrate, of the layer comprising the fluorescent material, ultraviolet radiation absorber and stabilizer.

47. The ultraviolet block material according to claim 46, wherein the layer farthest from the substrate on the side, opposite to the substrate, of the layer comprising the fluorescent material, ultraviolet radiation absorber and stabilizer is an adhesive layer showing a tackiness by means of heating or pressurization.

48. The ultraviolet block material according to claim 43, wherein the ultraviolet block layer comprises at least one layer between the substrate and the layer comprising the fluorescent material, ultraviolet radiation absorber and stabilizer and also comprises at least one layer on the side, opposite to the substrate, of the layer comprising the fluorescent material, ultraviolet radiation absorber and stabilizer.

49. An ultraviolet block material comprising a substrate, an ultraviolet block layer adhered on the substrate, and an abrasion resisting layer on the side of the substrate opposite to the ultraviolet block layer, wherein the ultraviolet block material is characterized by a transmittance for light within a wavelength range of 300–380 nm of 10% or less and a transmittance for light within a wavelength range of 420–800 nm of 90% or more.

50. The ultraviolet block material of claim 49, wherein transmittance for light within a wavelength range of 300–390 nm is 10% or less.

51. The ultraviolet block material of claim 49, wherein transmittance for light within a wavelength range of 300–400 nm is 10% or less.

52. An ultraviolet block material comprising a substrate and an ultraviolet block layer adhered on the substrate, wherein the ultraviolet block layer comprises at least one layer, wherein the layer of the ultraviolet block layer farthest from the substrate or the side, opposite to the ultraviolet block layer, of the substrate is a color material-receiving layer that has received color materials, and wherein the ultraviolet block material is characterized by a transmittance for light within a wavelength range of 300–380 nm of 10% or less and a transmittance for light within a wavelength range of 420–800 nm of 90% or more.

53. A method for the protection of a material to be adhered, comprising forming an image on a color material-receiving layer of the ultraviolet block material of claim 52 and then layering a substrate paper on the color material-receiving layer.

54. The ultraviolet block material of claim 52, wherein transmittance for light within a wavelength range of 300–390 nm is 10% or less.

55. The ultraviolet block material of claim 52, wherein transmittance for light within a wavelength range of 300–400 nm is 10% or less.

56. A method for protecting a material to be layered, comprising contacting the material to be layered with an ultraviolet block material, wherein the ultraviolet block material comprises a substrate and an ultraviolet block layer adhered on the substrate, wherein the side of the ultraviolet block layer farthest from the substrate is adhered to contact the material to be layered, and wherein the ultraviolet block material is characterized by a transmittance for light within a wavelength range of 300–380 nm of 10% or less and a transmittance for light within a wavelength range of 420–800 nm of 90% or more.

57. The method according to claim 56, wherein a surface of the material to be layered comprises an image formed by an ink jet recording system or a thermal transfer printing system.

58. The method of claim 56, wherein the ultraviolet block material is characterized by a transmittance for light within a wavelength range of 300–390 nm of 10% or less.

59. The method of claim 56, wherein the ultraviolet block material is characterized by a transmittance for light within a wavelength range of 300–400 nm of 10% or less.

60. An ultraviolet block material having a substrate and an ultraviolet block layer provided on the substrate in a releasable manner, the ultraviolet block material which is characterized in that, in the said ultraviolet block layer, the transmittance of the light within a range of 300–380 nm wavelength is 10% or less and the transmittance of the light within a range of 420–800 nm wavelength is 90% or more.

61. A method for the protection of a material to be transferred, characterized in that, the said method includes the steps that the farthest side of the ultraviolet block layer in the ultraviolet block material mentioned in claim 60 from the substrate is layered to contact the material to be transferred and then the substrate is separated from the ultraviolet block layer.

62. A material which is protected from ultraviolet light, produced by a method comprising the method of claim 61.

63. The ultraviolet block material of claim 60, wherein transmittance for light within a wavelength range of 300–390 nm is 10% or less.

64. The ultraviolet block material of claim 60, wherein transmittance for light within a wavelength range of 300–400 nm is 10% or less.

* * * * *